(12) United States Patent
Kwon et al.

(10) Patent No.: US 7,990,928 B2
(45) Date of Patent: Aug. 2, 2011

(54) FREQUENCY HOPPING METHOD AND APPARATUS IN A WIRELESS COMMUNICATION SYSTEM

(75) Inventors: Hwan-Joon Kwon, Hwaseong-si (KR); Seung-Kyun Oh, Suwon-si (KR); Ju-Ho Lee, Suwon-si (KR); Dong-Hee Kim, Yongin-si (KR); Jae-Chon Yu, Suwon-si (KR); Jin-Kyu Han, Seoul (KR); Yu-Chul Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1135 days.

(21) Appl. No.: 11/788,900

(22) Filed: Apr. 23, 2007

(65) Prior Publication Data

US 2008/0025285 A1  Jan. 31, 2008

(30) Foreign Application Priority Data

Apr. 21, 2006 (KR) .................. 10-2006-0036445

(51) Int. Cl.
*H04B 7/216* (2006.01)

(52) U.S. Cl. ......... 370/335; 370/329; 370/342; 370/344

(58) Field of Classification Search .................. 370/335, 370/336, 395.4, 329, 344; 455/450
See application file for complete search history.

(56) References Cited

U.S. PATENT DOCUMENTS

| 2005/0122898 A1 | 6/2005 | Jang et al. |
| 2005/0249120 A1 | 11/2005 | Heo et al. |
| 2005/0281188 A1 | 12/2005 | Cho et al. |
| 2006/0056360 A1 | 3/2006 | Parkvall et al. |

FOREIGN PATENT DOCUMENTS

KR  1020050099906  10/2005

*Primary Examiner* — Temica M Beamer
(74) *Attorney, Agent, or Firm* — The Farrell Law Firm, P.C.

(57) ABSTRACT

A method for supporting frequency hopping of a transmission apparatus by a reception apparatus in a wireless communication system supporting Hybrid Automatic Repeat reQuest (HARQ). The method includes determining whether a particular transmission apparatus has a need to perform hopping of allocating a different logical channel every Transmission Time Interval (TTI); and when there is no need to perform hopping every TTI, sending to the transmission apparatus a command to perform hopping every multiple TTIs, and simultaneously signaling information on a number of the multiple TTIs.

23 Claims, 9 Drawing Sheets

FREQUENCY HOPPING METHOD AND APPARATUS IN A WIRELESS COMMUNICATION SYSTEM

PRIORITY

This application claims the benefit under 35 U.S.C. §119 (a) of a Korean Patent Application filed in the Korean Intellectual Property Office on Apr. 21, 2006 and assigned Serial No. 2006-36445, the disclosure of which is incorporated herein by reference.

BACKGROUND OF THE INVENTION

1. Field of the Invention

The present invention generally relates to a frequency hopping apparatus and method in a wireless communication system, and in particular, to a frequency hopping apparatus and method in a Frequency Division Multiple Access (FDMA) wireless communication system.

2. Description of the Related Art

Wireless communication systems have been developed to provide communication regardless of positions of users. Each of the wireless communication systems distinguishes users with limited resources and performs communication with the users. There are various possible schemes which can be classified according to the method of using limited resources. For example, a scheme of distinguishing users with orthogonal code resources is referred to as Code Division Multiple Access (CDMA), a scheme of distinguishing users with time resources is referred to as Time Division Multiple Access (TDMA), and a scheme of distinguishing users with frequency resources is referred to as Frequency Division Multiple Access (FDMA).

Each of the foregoing schemes can be subdivided into various types, and more than two schemes can be used together. For example, as for FDMA, a method of allocating orthogonal frequency resources to every user in a particular manner and performing communication with the user is referred to as Orthogonal Frequency Division Multiple Access (OFDMA). Therefore, the OFDMA method is one of the FDMA methods. Each of the various systems allocates its system resources to users and performs communication with the users. A description will now be made of resource allocation with reference to, for example, an OFDMA system.

FIG. 1A shows an application of hopping in an OFDMA system according to the prior art. OFDMA is a system that supports multiple access by allocating different orthogonal sub-carriers to users.

Referring to FIG. 1A, the horizontal axis indicates the time axis, and the vertical axis indicates the frequency axis. A description will now be made of each part shown in FIG. 1A. One rectangle denoted by reference numeral 101 indicates one block. That is, in OFDMA, resources are allocated in units of the blocks, user data is encoded into a coded sequence according to a predetermined rule, and the one coded sequence is transmitted through one or multiple blocks.

FIG. 1B shows a structure of one block according to the prior art. With reference to FIG. 1B, a description will now be made of one block.

Referring to FIG. 1B, one block is shown which is a basic resource allocation unit in a general OFDMA system. Reference numeral 101-1 denotes one sub-carrier in the frequency axis, and reference numeral 101-2 denotes one slot in the time axis. That is, the slot is a basic transmission unit in the time axis, and one slot generally includes multiple OFDM symbols. In FIG. 1B, a length of a small square in the time axis is a length of one OFDM symbol. As described above, one block is composed of multiple sub-carriers and multiple OFDM symbols. In the foregoing example, one block is a 2-dimensional square which is composed of 8 sub-carriers in the frequency axis and 10 OFDM symbols in the time axis. Therefore, 8×10 modulation symbols can be transmitted in one block. The parts denoted by reference numeral 101-3 indicate the positions where pilot symbols are transmitted, and the other parts denoted by reference numeral 101-4 indicate the positions where data symbols are transmitted. That is, coherent detection is achieved depending on channel estimate values obtained using the pilot symbols in a demodulation process for the data symbols transmitted on the one block. Data is demodulated through the coherent detection. The block formed as shown in FIG. 1B is one square in FIG. 1A.

Although a localized block, elements of which are localized in one block, has been described in the foregoing example, a distributed block, elements of which are distributed over several blocks, is also possible. In FIG. 1A, numerals denoted by reference numeral 102 are identifiers for Transmission Time Intervals (TTIs). One TTI, denoted by reference numeral 104, is a time unit for which a coded sequence for one data packet is transmitted, and one TTI is generally composed of one or multiple slots. In the foregoing example, one slot is composed of one TTI. Numerals denoted by reference numeral 103 are identifiers for blocks in the frequency axis, and as shown by reference numeral 105, shaded squares indicate one logical channel. The logical channel is a resource allocation unit, and a phrase 'allocation of a logical channel #1 to a particular user' indicates a process of allocating specific blocks predefined between a transmitter and a receiver to the user. In the channel allocation, the term 'logical' is used for the following reasons. The system, to which frequency hopping (hopping) is applied, defines the logical channels rather than physically defining channels and allocating the physical channels. This is because it is convenient to define mapping between the logical channels and physical channels using a specific hopping sequence.

Hopping, as used herein, means an operation in which squares corresponding to the logical channel #1 of FIG. 1A continue to change with the passage of time. Hopping is effective when it is applied, particularly in cellular systems. This is because the same logical channel #1 is allocated to different users between two adjacent cells and different hopping patterns are defined between cells, thereby contributing to randomization of inter-cell interference.

Generally, a mobile communication system uses Hybrid Automatic Repeat reQuest (HARQ) in transmitting packet data. HARQ is an important technology used for increasing data transmission reliability and data throughput in a packet-based mobile communication system. HARQ refers to a combined technology of Automatic Repeat reQuest (ARQ) technology and Forward Error Correction (FEC) technology. ARQ is a technology which is popularly used in wire/wireless data communication systems. In the ARQ technology, a transmitter transmits a transmission data packet with a sequence number assigned thereto according to a predefined rule, and a data receiver sends to the transmitter a retransmission request for a missing packet among the received packets using the sequence number, thereby achieving reliable data transmission. FEC means a technology for adding redundant bits to transmission data according to a specific rule, such as convolutional coding, turbo coding, etc., to cope with noises generated in a data transmission/reception process and/or errors occurring in fading environments, thereby demodulating the transmitted original data. In a system using HARQ realized by combining the two technologies, i.e. ARQ and FEC, a data receiver performs a Cyclic Redundancy Check (CRC) check on the data decoded through an inverse FEC process on the received data, to determine presence/absence of an error in the received data. In absence of error, the data receiver feeds back an Acknowledgement (ACK) to a transmitter so the transmitter may transmit the next data packet. However, if it is determined from the CRC check result that there is an error in the received data, the data receiver feeds back a Non-Acknowledgement (NACK) to the transmitter, requesting retransmission of the previously transmitted packet. In this process, the receiver combines the retransmitted packet with the previously transmitted packet to obtain energy gain, thereby obtaining highly improved performance compared with the conventional ARQ not having the combining process.

FIG. 2 shows resource allocation in a system to which HARQ is applied according to the prior art. The parts denoted by reference numerals 201, 202, 203 and 204 are similar to corresponding parts in FIG. 1A. Interlace indexes denoted by reference numeral 205 are identifiers for TTIs in which one HARQ operation is performed in the time axis. That is, in the system to which HARQ is applied, packet data transmission is performed in the TTIs corresponding to the same interlace identifier. For example, FIG. 2 means that TTI identifiers corresponding to an interlace #0 are 0, 6, 12, 18, . . . , and independent packet data is transmitted/received for individual interlaces. In this example, there are 6 interlaces #0, #1, #2, #3, #4 and #5. Generally, the number of interlaces is determined during system design taking into account a data demodulation time and a transmission time of ACK/NACK 206. In the foregoing description, a time interval between interlaces, i.e. a time interval between retransmissions for one packet for one HARQ operation, is defined as an HARQ Round Trip Time (RTT) 208.

The hopping described in FIG. 1A is disadvantageous in that it may decrease in channel estimation performance because a position of the same logical channel changes. More specifically, as shown in FIG. 1B, channel estimation should be performed through specific pilot symbols in the block. However, in a system not supporting the hopping, i.e. when one logical channel includes the same block index in the time axis, channel estimation performance can be improved by using more pilot symbols included in several consecutive blocks in the channel estimation process. On the contrary, a system to which the hopping is applied should perform channel estimation only with pilots included in one block, causing a decrease in its performance. However, if HARQ is applied without the hopping as shown in FIG. 2, HARQ performance may decrease. For example, in FIG. 2, a packet initially transmitted at TTI #0 may fail in successful demodulation at a receiver, when a position of the block corresponds to the position having a poor channel environment in the frequency axis or having considerable interference from other cells. Therefore, it is preferable to attempt transmission over different blocks during retransmission to obtain diversity gain. In other words, performing retransmission in the same position in TTI #6, as shown in FIG. 2, may have difficulty in obtaining the diversity gain.

SUMMARY OF THE INVENTION

The present invention addresses at least the above-described problems and/or disadvantages and provides at least the advantages described below. Accordingly, an aspect of the present invention is to provide an interlace common block hopping apparatus and method in a wireless communication system, capable of making the most of the advantages of hopping and HARQ technologies, which are used simultaneously and have opposite characteristics.

Another aspect of the present invention is to provide an interlace common block hopping apparatus and method for partially or fully restricting hopping within one HARQ RTT to enable transmission of consecutive blocks without change in their positions, thereby improving channel estimation performance through pilot symbols in the consecutive blocks in a wireless communication system.

A further aspect of the present invention is to provide an interlace common block hopping apparatus and method in a wireless communication system, capable of guaranteeing hopping to be performed between TTIs corresponding to the same interlace to allow a change in position of a block during retransmission for HARQ, thereby obtaining diversity for interference.

According to an aspect of the present invention, there is provided a method for supporting frequency hopping of a transmission apparatus by a reception apparatus in a wireless communication system supporting HARQ. The method includes determining whether a particular transmission apparatus has a need to perform hopping of allocating a different logical channel every TTI; and when there is no need to perform hopping every TTI, sending to the transmission apparatus a command to perform hopping every multiple TTIs, and simultaneously signaling information on a number of the multiple TTIs.

According to another aspect of the present invention, there is provided a frequency hopping method of a transmission apparatus in a wireless communication system supporting HARQ. The method includes receiving signaling for a hopping unit from a reception apparatus; determining whether to perform hopping of allocating a different channel every TTI; and performing frequency block hopping of allocating a same channel every multiple TTIs when the transmission apparatus determines not to perform hopping every TTI.

According to still another aspect of the present invention, there is provided a frequency hopping method of a transmission apparatus in a wireless communication system supporting HARQ. The method includes determining whether there is a need to perform hopping of allocating a different frequency channel every TTI; and performing frequency block hopping of allocating the same frequency channel every multiple TTIs when there is no need to perform hopping every TTI.

According to yet another aspect of the present invention, there is provided a frequency hopping apparatus in a wireless communication system. The apparatus includes a hopping sequence input generator for generating a hopping sequence input value; a hopping sequence generator for generating a hopping sequence as an output of the hopping sequence input generator; and a controller for controlling data transmission/reception according to the hopping sequence.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described with reference to the annexed drawings. In the following description, descriptions of known functions and configurations incorporated herein have been omitted for clarity and conciseness.

In a wireless communication system supporting Hybrid Automatic Repeat reQuest (HARQ), a hopping method provided by the present invention partially or fully restricts hopping within one HARQ Round Trip Time (RTT). That is, the proposed hopping method guarantees hopping to be achieved between Transmission Time Intervals (TTIs) corresponding to the same interlace, to allow a change in position of the block during retransmission for HARQ, thereby obtaining diversity for interference.

In addition, the proposed hopping method partially or fully restricts hopping within one HARQ RTT to allow transmission of consecutive blocks without change in their positions, thereby improving channel estimation performance through pilot symbols in the consecutive block.

Examples for accomplishing a hopping method according to the present invention are described below.

One example of the present invention allows hopping to be performed every HARQ RTT (i.e. on an HARQ RTT by HARQ RTT basis) for one logical channel. Another example of the present invention provides different input values of a hopping sequence generator for individual interlaces. Another example of the present invention prevents hopping from being performed for an interval corresponding to one of the divisors of the HARQ RTT within one HARQ RTT.

These examples will now be described with reference to FIGS. 3 to 6.

Figure 3:
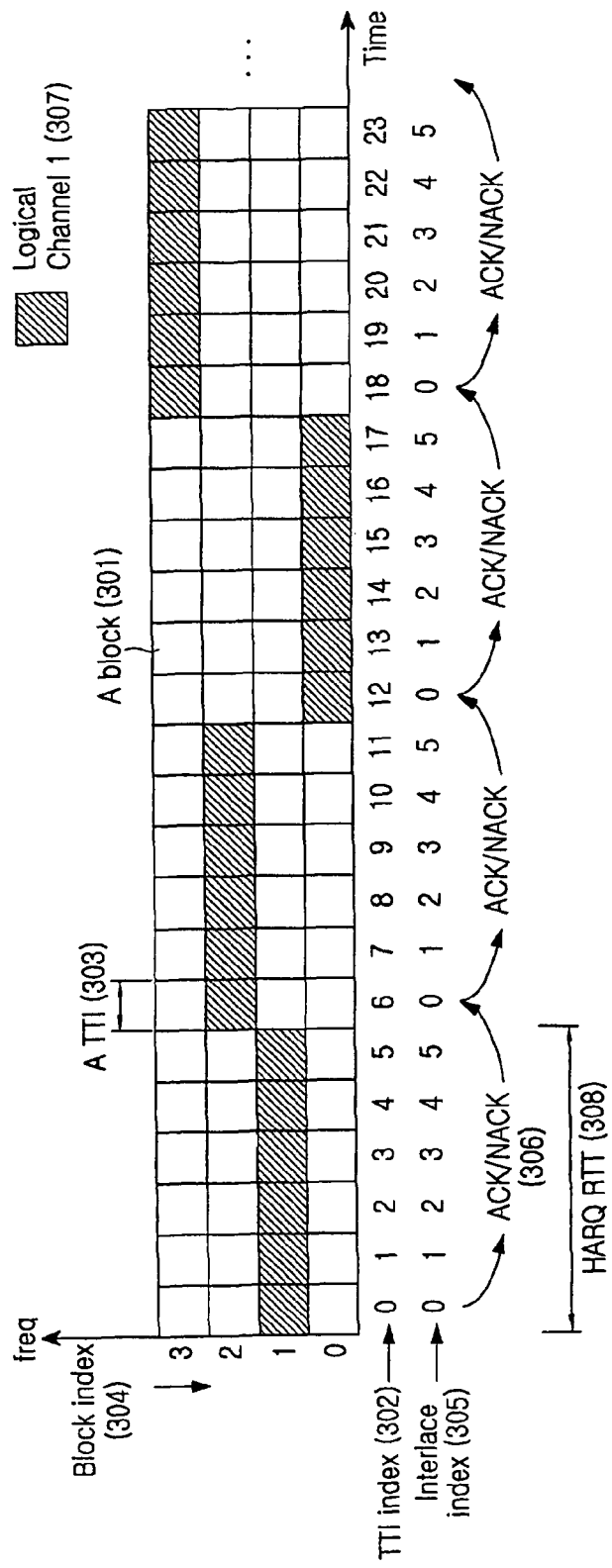
FIG. 3 is a diagram illustrating hopping according to a first embodiment of the present invention.

FIG. 3 shows an example according to the present invention that allows hopping to be performed every HARQ RTT for one logical channel in a packet data mobile communication system supporting HARQ.

Figure 1A:
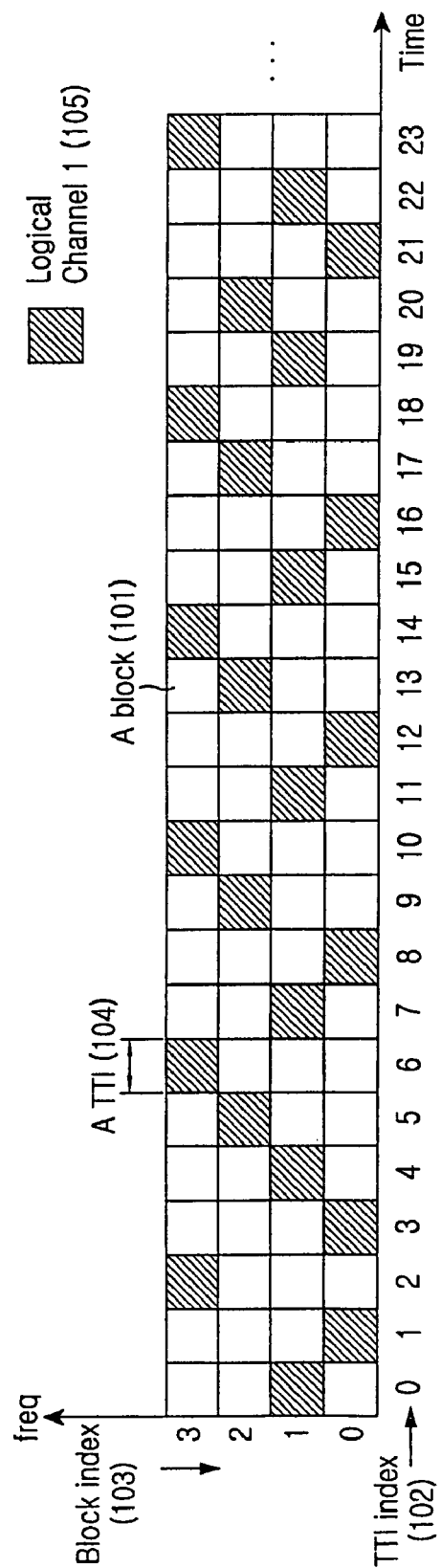
FIG. 1A is a diagram illustrating application of hopping in an OFDMA system according to the prior art.
Figure 1B:
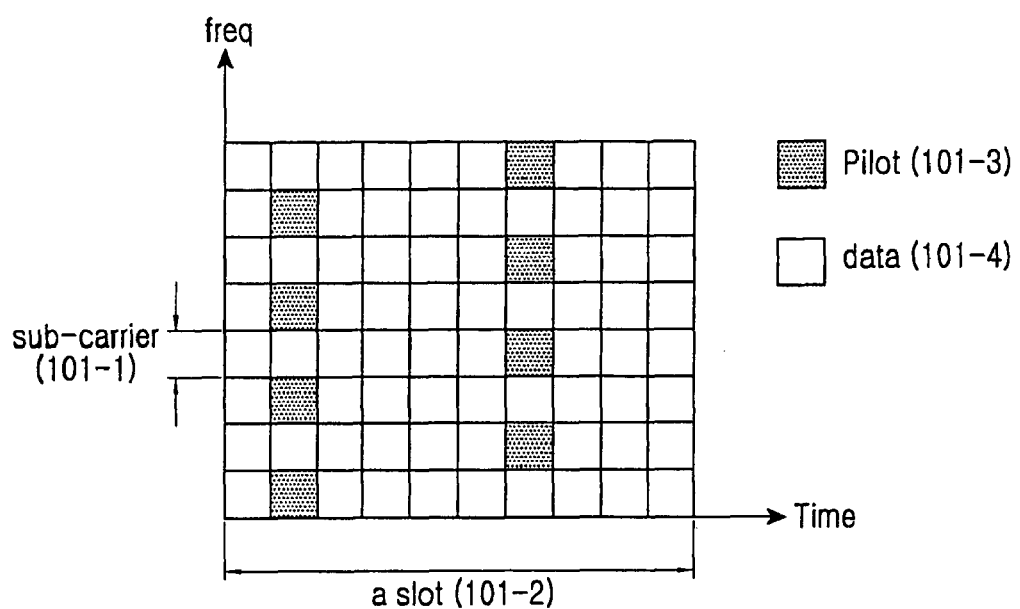
FIG. 1B is a diagram illustrating a detailed structure of one block according to the prior art.
Figure 2:
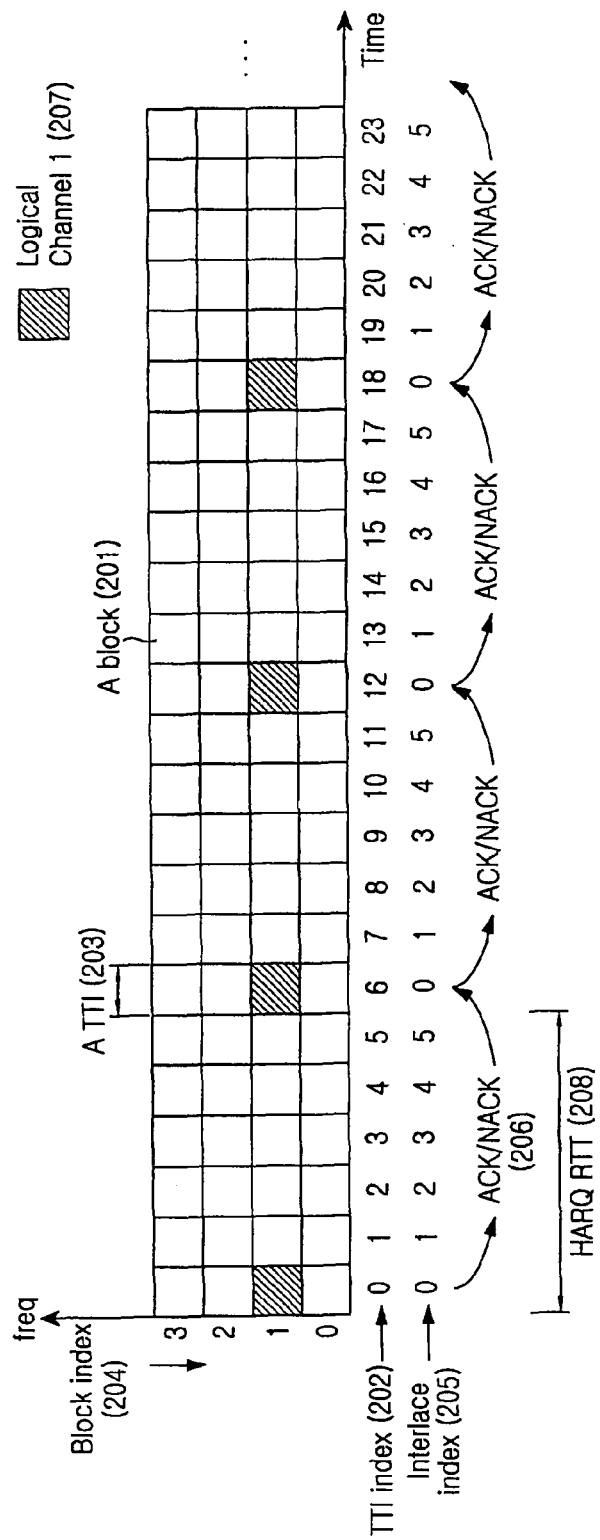
FIG. 2 is a diagram illustrating resource allocation in a system to which HARQ is applied according to the prior art.

Referring to FIG. 3, a block 301, a TTI index 302, one TTI 303, a block index 304, an interlace index 305, an Acknowledgement/Non-Acknowledgement (ACK/NACK) feedback 306, and an HARQ RTT 308 correspond to similar parts shown in FIGS. 1A, 1B and 2.

In FIG. 3, at positions of blocks for a logical channel #1 denoted by reference numeral 307, hopping is not performed for one HARQ RTT. That is, hopping is performed every HARQ RTT. Two methods may be used to implement the hopping method of FIG. 3. A description will now be made of a hopping sequence generator with reference to FIG. 4. This sequence generator may be used with the two methods, which will also be described below.

Figure 4:
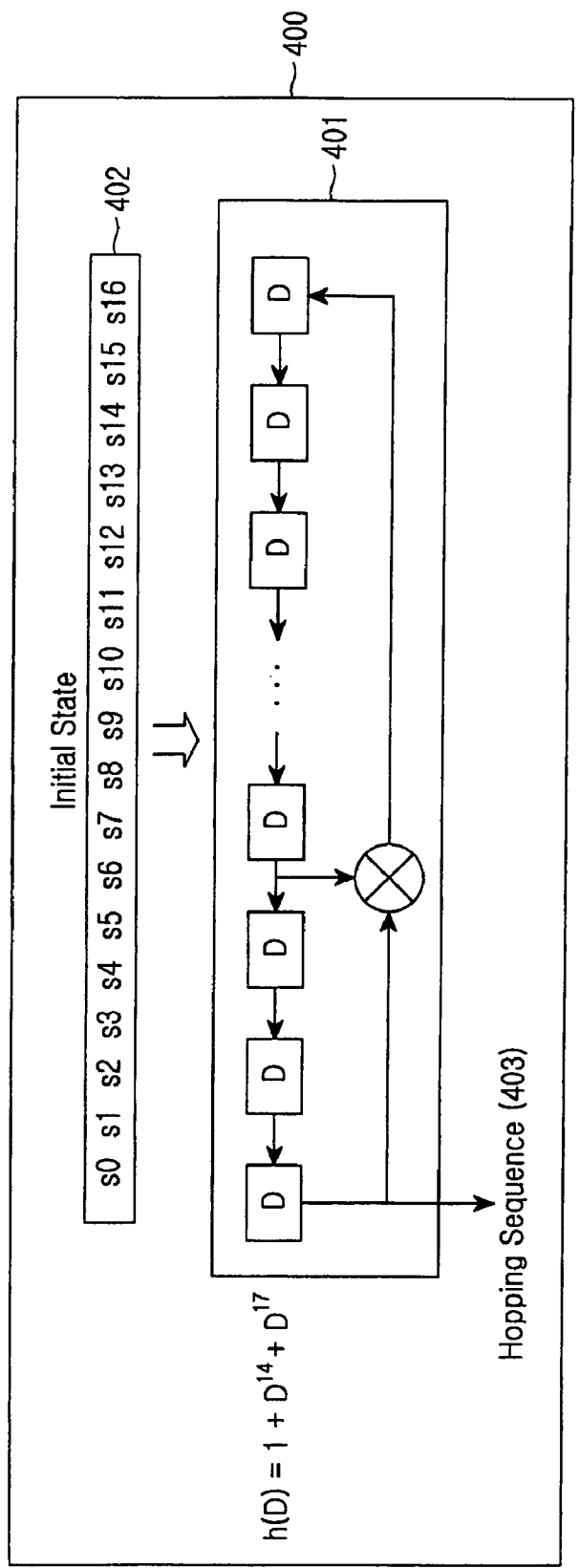
FIG. 4 is a diagram illustrating an example of a hopping sequence generator according to the present invention.

FIG. 4 shows an example of a hopping sequence generator according to the present invention. A block denoted by reference numeral 401 is a shift register sequence generator. Reference numeral 402 indicates initial input values for the shift register sequence generator 401. The shift register sequence generator 401 outputs one value at one clock, and a series of the output values constitutes a hopping sequence 403. When the hopping sequence generator of FIG. 4 is applied to the hopping method of FIG. 3, one sequence is output every TTI.

One method for implementing the hopping method of FIG. 3 generates and applies a hopping sequence using TTI indexes as input values 402 for the hopping sequence generator 400, and generates the sequence every HARQ RTT and equally applies the sequence values used in the previous HARQ RTT, in TTIs between HARQ RTTs of the generated sequence. It should be noted herein that other values except for TTI indexes can also be used as inputs of shift register sequence generator 401.

For example, a hopping sequence generated through an input value '0' at TTI #0 is used from TTI #0 till TTI #5, and a hopping sequence generated through an input value '6' at TTI #6, which is a slot lagging behind TTI #0 by HARQ RTT, is used from TTI #6 till TTI #11. The hopping sequences at the succeeding TTIs are generated by repeating the foregoing method.

Another method for implementing the hopping method of FIG. 3 with the hopping sequence generator 400 of FIG. 4 generates a hopping sequence every slot, using the values calculated from Equation (1) as input values of the shift register sequence generator 401.

$$\left\lfloor \frac{TTIid}{NumInterlace} \right\rfloor \quad (1)$$

In Equation (1), TTI id denotes a TTI identifier 302, and NumInterlace denotes a predetermined number of HARQ interlaces. In the example of FIG. 3, the NumInterlace value is 6. Further, in Equation (1), $\lfloor x \rfloor$ denotes an operator indicating the maximum integer not exceeding 'x'. That is, for the slots with TTI identifiers #0 to #5, input values of the shift register sequence generator 401, calculated using Equation (1), are all '0', and for the slots with TTI identifiers #6 to #11, input values of the shift register sequence generator 401, calculated using Equation (1), are all '1'.

This method for implementing the hopping method of FIG. 3 defines a parameter InterlaceCommonHopping. If a base station sets the InterlaceCommonHopping value to '1', hopping is applied every HARQ RTT as shown in FIG. 3. However, if the base station sets the InterlaceCommonHopping value to '0', hopping is applied every TTI as shown in FIG. 1.

Figure 5:
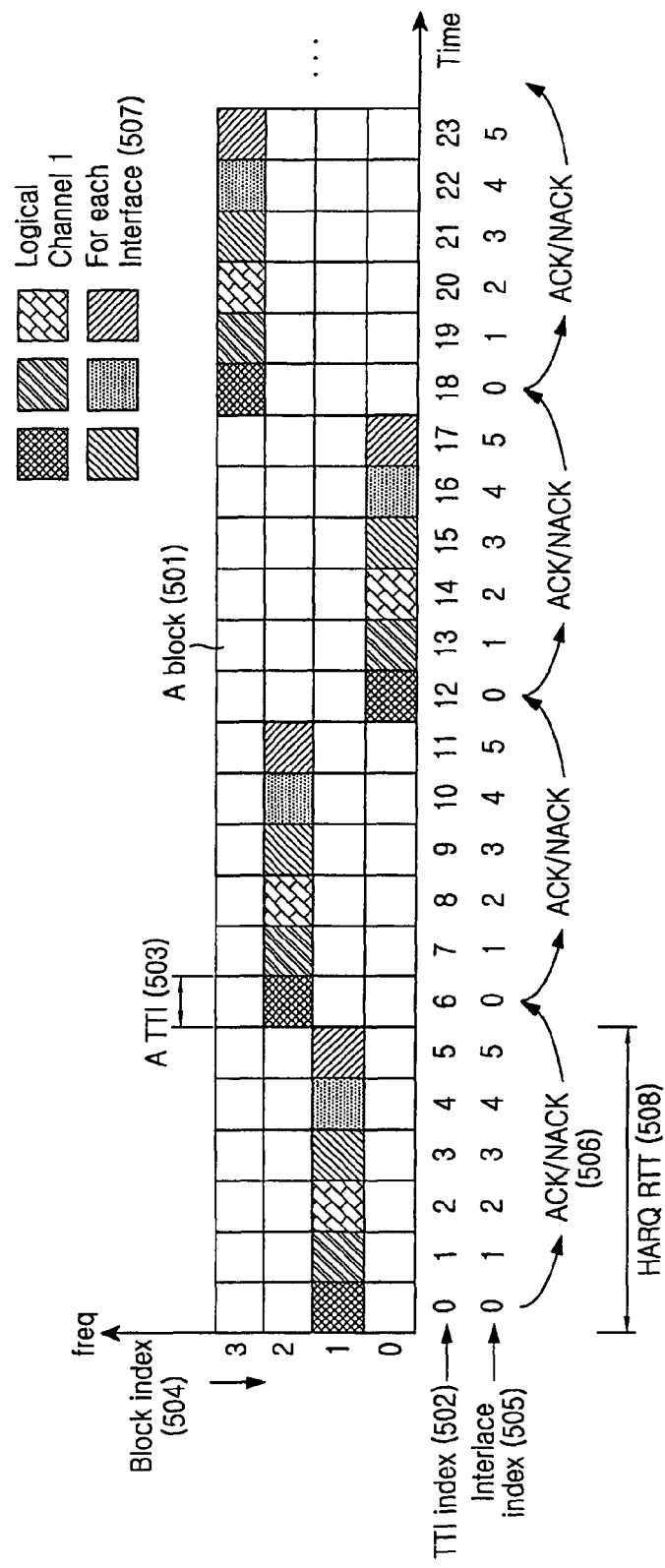
FIG. 5 is a diagram illustrating an example of hopping according to a second embodiment of the present invention.

FIG. 5 shows an example according to the present invention that can provide different input values of the hopping sequence generator 400 for individual interlaces for one logical channel in a wireless communication system supporting HARQ.

In FIG. 5, a block 501, a TTI index 502, one TTI 503, a block index 504, an interlace index 505, an ACK/NACK feedback 506, and an HARQ RTT 508 are similar to corresponding parts shown in FIGS. 1A, 1B and 2. In FIG. 5, expressing blocks in different patterns as shown by reference numeral 507 means that the hopping sequence can be different for each individual interlace. This example generates a hopping sequence using an interlace id together with the values calculated from Equation (1) as input values of the shift register sequence generator 401 in the hopping sequence generator 400 of FIG. 4, and applies the generated hopping sequence every TTI.

This example defines a parameter InterlaceCommonHopping. If the base station sets the InterlaceCommonHopping value to '0', the method generates a hopping sequence using an interlace id together with the values calculated from Equation (1) as input values of the shift register sequence generator 401 in the hopping sequence generator 400 of FIG. 4, and applies the generated hopping sequence every TTI. The method of using different hopping sequences for individual interlaces is advantageous in that it can guarantee that in an HARQ process, packets transmitted in the same interlace are always located in different positions from the positions of the immediately previously transmitted packets, thereby contributing to an increase in diversity effect compared with the method of performing hopping using one hopping sequence for all HARQ interlaces. If the base station sets the InterlaceCommonHopping value to '1', the method generates a hopping sequence using a predefined common interlace id, for example, '0', for all interlaces, together with the values calculated from Equation (1) as input values of the shift register sequence generator 401 in the hopping sequence generator 400 of FIG. 4, and applies the generated hopping sequence every TTI.

Figure 6:
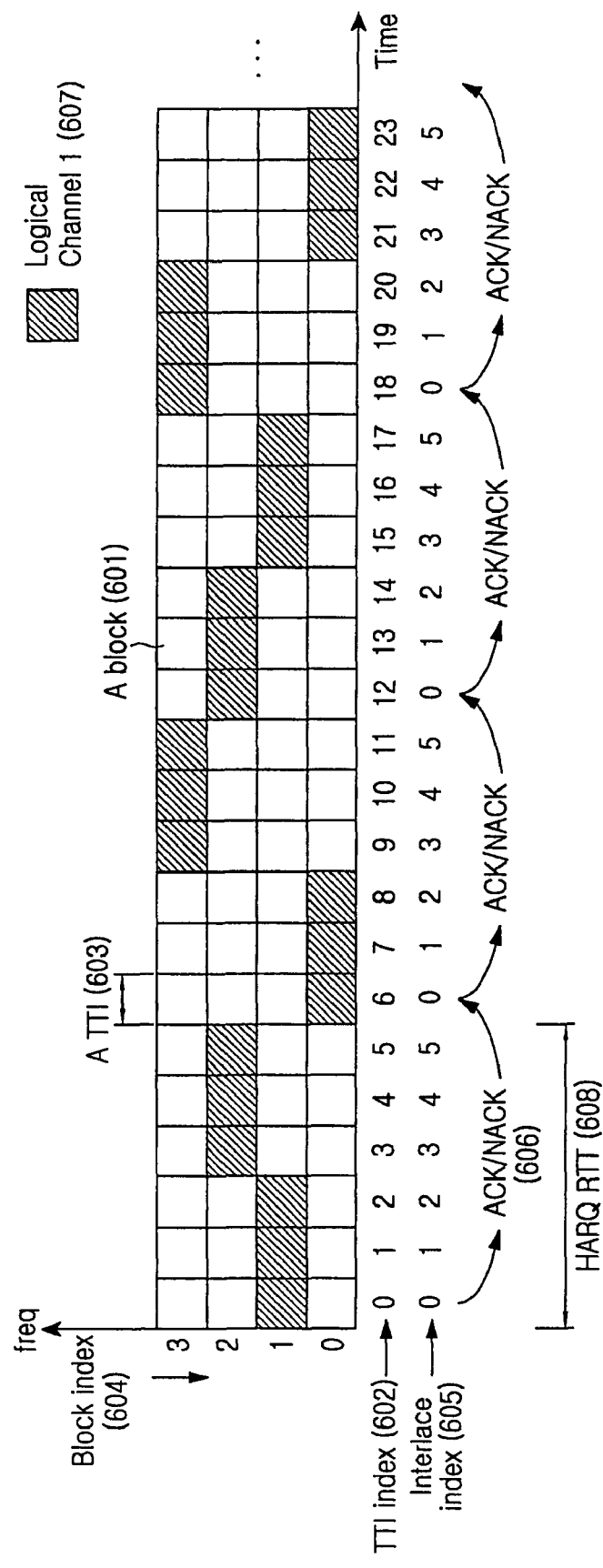
FIG. 6 is a diagram illustrating an example of hopping according to a third embodiment of the present invention.

FIG. 6 shows an example according to the present invention that prevents hopping from being performed in units of an interval corresponding to one of as many divisors as the number of TTIs included in the HARQ RTT within one HARQ RTT for one logical channel in a wireless communication system supporting HARQ.

In FIG. 6, a block 601, a TTI index 602, one TTI 603, a block index 604, an interlace index 605, an ACK/NACK feedback 606, and an HARQ RTT 608 are similar to corresponding parts shown in FIGS. 1A, 1B and 2.

The number of TTIs included in the HARQ RTT within one HARQ RTT is 6, and divisors of 6 are 1, 2, 3 and 6. That is, hopping is performed in units of an interval corresponding to one of 1, 2, 3 and 6. In the example of FIG. 6, 3 divisors are used and hopping is performed every 3 TTIs.

In this example of the present invention in an arbitrary system, the base station defines a parameter NumTTIHopping and notifies the NumTTIHopping value to terminals, and the terminals apply hopping in units of TTIs corresponding to the NumTTIHopping value. The NumTTIHopping is defined herein as divisors, the number of which is equal to the number of TTIs included in the HARQ RTT within one HARQ RTT. This example of the present invention uses values calculated from Equation (2) as input values of the shift register sequence generator 401 in the hopping sequence generator 400 of FIG. 4.

$$\left\lfloor \frac{TTIid}{NumTTIHopping} \right\rfloor \qquad (2)$$

This method applies the hopping sequence 403 generated using the input values every TTI.

Figure 7:
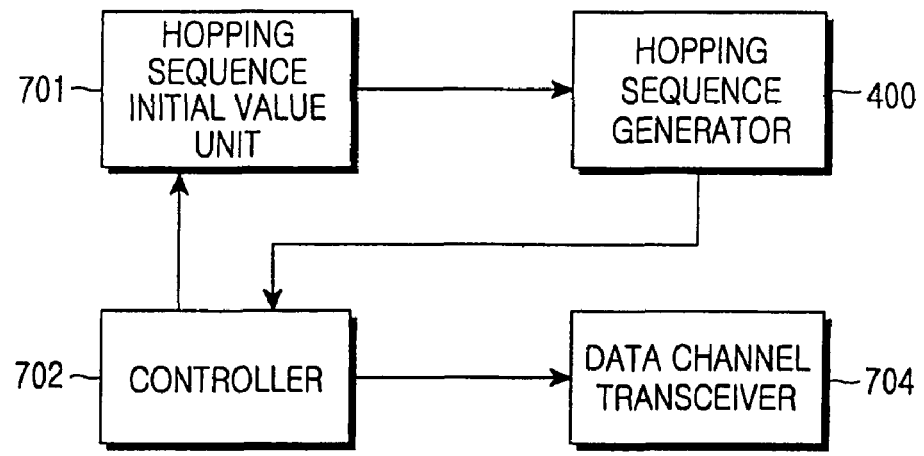
FIG. 7 is a diagram illustrating a structure of a data transceiver according to an embodiment of the present invention.

FIG. 7 shows a data transceiver according to the present invention. The data transceiver includes a hopping sequence initial value input unit 701, a hopping sequence generator 400, a controller 702, and a data channel transceiver 704.

The hopping sequence initial value input unit 701 generates hopping sequence input values under the control of the controller 702. The controller 702 controls the hopping sequence initial value input unit 701 to generate hopping sequence input values according to the first to third embodiments. The output of the hopping sequence initial value input unit 701 is input to the hopping sequence generator 703, and the hopping sequence generator 703 generates a hopping sequence in the operation of the shift register sequence generator 401 of FIG. 4 and outputs the generated hopping sequence to the hopping sequence 403. The output hopping sequence is input back to the controller 702. The controller 702 controls the data channel transceiver 704 to perform data transmission/reception according to the hopping sequence. The data channel transceiver 704 performs data encoding/decoding and transmission/reception according to a specific procedure.

In addition, in exemplary frequency block hopping-based reverse transmission, an apparatus for which the base station supports reverse hopping has the structure shown in FIG. 7, but the controller 702 determines whether a forward channel or a reverse channel for a specific terminal needs hopping every TTI, and if the channel does not need to perform hopping every TTI, the controller 702 sends to the terminal a command to perform hopping every multiple TTIs and generates information indicating the number of the multiple TTIs. Then the data channel transceiver 704 signals the information generated in the controller 702.

A description will now be made of an example of the foregoing frequency block hopping applied to reverse transmission. That is, a base station signals, to a terminal, information on a TTI unit for frequency block hopping, and the terminal performs reverse frequency block hopping according to the signaled signal. However, the present invention is not limited to reverse frequency block hopping and can be also applied to forward frequency block hopping.

Figure 8:
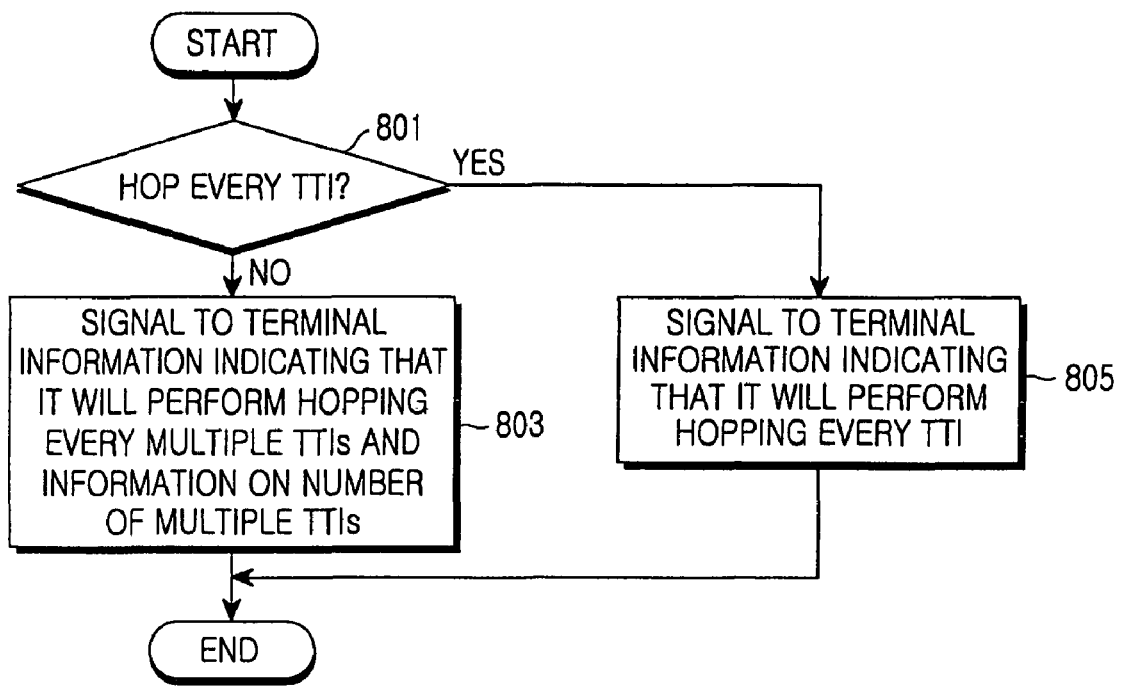
FIG. 8 is a flowchart illustrating an operation of a base station according to a preferred embodiment of the present invention.

FIG. 8 shows an operation of a base station according to the present invention. A base station determines in step 801 whether it will perform frequency block hopping every TTI (or a group of TTIs). If the base station determines not to perform frequency block hopping every TTI, the base station signals, in step 803, information to a terminal indicating that the base station will perform frequency hopping every multiple TTIs, and information on the number of the multiple TTIs.

A hopping method shown in FIG. 3, 5 or 6 is used in step 803.

If the base station determines to perform hopping every TTI in step 801, the base station signals to the terminal, in step 805, a command to perform frequency hopping every TTI.

Figure 9:
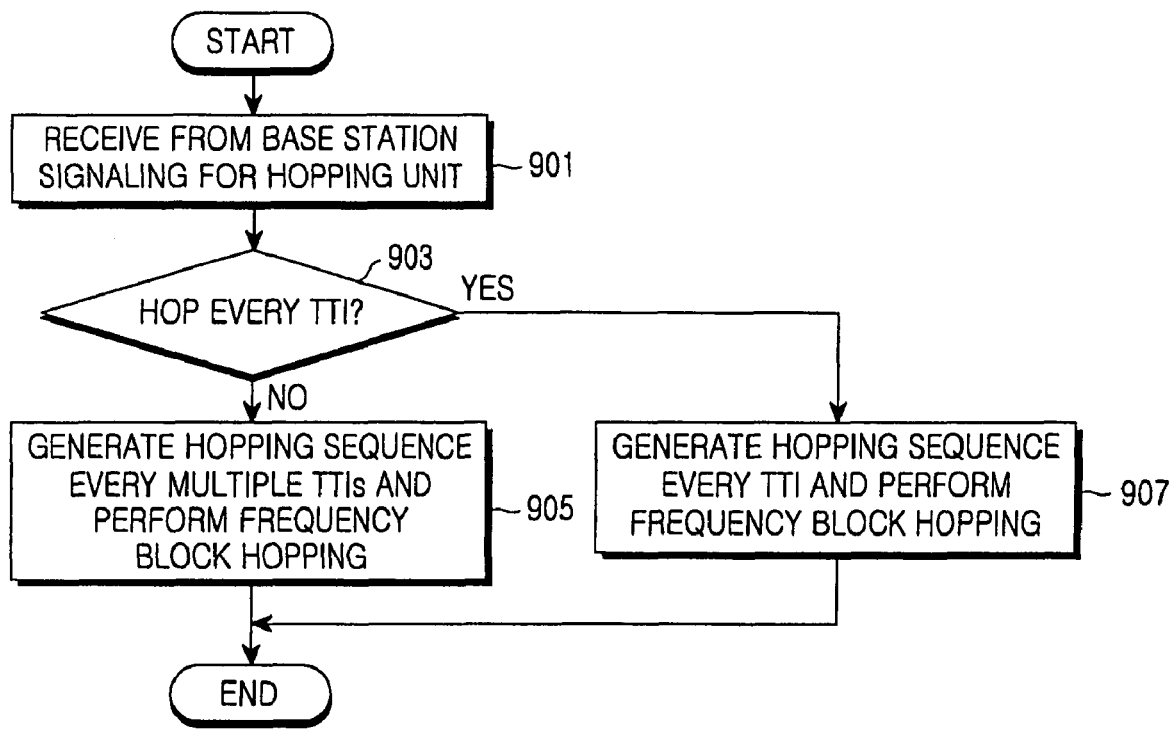
FIG. 9 is a flowchart illustrating an operation of a terminal according to a preferred embodiment of the present invention.

FIG. 9 shows an operation of a terminal according to the present invention. A terminal receives a signaling from a base station, in step 901, a signaling for the unit in which it will perform frequency hopping. The terminal determines, in step 903, whether the signaling reception result indicates a command to perform hopping every TTI.

If there is no command to perform hopping every TTI, the terminal generates, in step 905, a hopping sequence every multiple TTIs and performs frequency block hopping with the hopping sequence.

However, if the signaling indicates a command to perform hopping every TTI, the terminal generates, in step 907, a hopping sequence every TTI and performs frequency block hopping using the hopping sequence.

As is apparent from the foregoing description, the present invention can make the most of the advantages of hopping and HARQ technologies, which are used simultaneously and have opposite characteristics.

In addition, the present invention partially or fully restricts hopping within one HARQ RTT to enable transmission of consecutive blocks without change in their positions, thereby improving channel estimation performance through pilot symbols in the consecutive blocks in a wireless communication system.

Further, the present invention can guarantee hopping to be performed between TTIs corresponding to the same interlace to allow a change in position of a block during retransmission for HARQ, thereby obtaining diversity for interference.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for supporting frequency hopping in a base station of a wireless communication system supporting Hybrid Automatic Repeat reQuest (HARQ), the method comprising:
    determining whether a forward channel or a reverse channel for a specific terminal needs hopping every Transmission Time Interval (TTI); and
    when there is no need to perform hopping every TTI, sending to the terminal a command to perform hopping every multiple TTIs, and simultaneously signaling information on a number of the multiple TTIs.

2. The method of claim 1, wherein the number of the multiple TTIs is a numeral corresponding to a divisor of HARQ Round Trip Time (RTT) when there is no need to perform hopping every TTI.

3. The method of claim 1, wherein the base station sets a InterlaceCommonHopping value to '1' and signals the setting result when there is no need to perform hopping every TTI, and the base station sets the InterlaceCommonHopping value to '0' and signals the setting result when there is a need to perform hopping of allocating a different channel every TTI.

4. A frequency hopping method in a terminal of a wireless communication system supporting Hybrid Automatic Repeat reQuest (HARQ), the method comprising:
    receiving signaling for a hopping unit from a base station, and determining whether a forward channel or a reverse channel includes a command to perform hopping every Transmission Time Interval (TTI); and
    hopping a frequency block every multiple TTIs and receiving the forward channel or transmitting the reverse channel, when the terminal does not perform hopping every TTI.

5. The frequency hopping method of claim 4, wherein the determining comprises:
    applying hopping every multiple TTIs if a InterlaceCommonHopping value signaled from a base station is set to '1', and applying hopping every TTI when the InterlaceCommonHopping value is set to '0'.

6. The frequency hopping method of claim 4, wherein when the terminal does not perform hopping every TTI, the terminal generates a hopping sequence every HARQ Round Trip Time (RTT), and performs hopping according to the generated hopping sequence for TTIs included in the same HARQ RTT.

7. The frequency hopping method of claim 4, wherein the terminal generates an input value for generation of a hopping sequence using the following equation when the terminal does not perform hopping every TTI:

$$\left\lfloor \frac{TTIid}{NumInterlace} \right\rfloor$$

where TTI id denotes a TTI identifier, NumInterlace denotes a number of HARQ interlaces, and $\lfloor x \rfloor$ denotes an operator indicating a maximum integer not exceeding 'x'.

8. The frequency hopping method of claim 4, wherein the terminal defines a value calculated using the following equation and an interlace identifier as an input value for generation of a hopping sequence when the terminal does not perform hopping every TTI:

$$\left\lfloor \frac{TTIid}{NumInterlace} \right\rfloor$$

where TTI id denotes a TTI identifier, NumInterlace denotes a number of HARQ interlaces, and $\lfloor x \rfloor$ denotes an operator indicating a maximum integer not exceeding 'x'.

9. The frequency hopping method of claim 4, wherein if the terminal does not perform hopping every TTI, the terminal generates an input value for generation of a hopping sequence using the following equation:

$$\left\lfloor \frac{TTIid}{NumTTIHopping} \right\rfloor$$

where TTI id denotes a TTI identifier, NumTTIHopping denotes divisors, a number of which is equal to a number of TTIs included in an HARQ RTT within one HARQ RTT, and $\lfloor x \rfloor$ denotes an operator indicating a maximum integer not exceeding 'x'.

10. A frequency hopping method in a base station of a wireless communication system supporting Hybrid Automatic Repeat reQuest (HARQ), the method comprising:
    determining whether a forward channel or a reverse channel needs hopping every Transmission Time Interval (TTI); and
    when there is no need to perform hopping every TTI, hopping a frequency block every multiple TTIs, and transmitting the forward channel or receiving the reverse channel.

11. The frequency hopping method of claim 10, wherein if the base station does not perform hopping every TTI, the base station generates a hopping sequence every HARQ Round Trip Time (RTT), and performs hopping according to the generated hopping sequence for TTIs included in the same HARQ RTT.

12. The frequency hopping method of claim 10, wherein the base station generates an input value for generation of a hopping sequence using the following equation when the base station does not perform hopping every TTI:

$$\left\lfloor \frac{TTIid}{NumInterlace} \right\rfloor$$

where TTI id denotes a TTI identifier, NumInterlace denotes a number of HARQ interlaces, and $\lfloor x \rfloor$ denotes an operator indicating a maximum integer not exceeding 'x'.

13. The frequency hopping method of claim 10, wherein the base station defines a value calculated using the following equation and an interlace identifier as an input value for generation of a hopping sequence when the base station does not perform hopping every TTI:

$$\left\lfloor \frac{TTIid}{NumInterlace} \right\rfloor$$

where TTI id denotes a TTI identifier, NumInterlace denotes a number of HARQ interlaces, and $\lfloor x \rfloor$ denotes an operator indicating a maximum integer not exceeding 'x'.

14. A frequency hopping apparatus in a wireless communication system, the apparatus comprising:
a hopping sequence initial value input unit for providing an initial input value of a hopping sequence;
a hopping sequence generator for generating a hopping sequence to perform hopping every multiple Transmission Time Intervals (TTIs) according to the initial input value; and
a controller for controlling data transmission/reception according to the hopping sequence.

15. The frequency hopping apparatus of claim 14, wherein the hopping sequence generator generates and applies a hopping sequence using an initial input value including a TTI index in such a manner that it generates the sequence every HARQ Round Trip Time (RTT) and equally applies the generated sequence value in TTIs within the HARQ RTT.

16. The frequency hopping apparatus of claim 14, wherein the hopping sequence initial value input unit provides an initial input value of a hopping sequence every TTI using:

$$\left\lfloor \frac{TTIid}{NumInterlace} \right\rfloor$$

where TTI id denotes a TTI identifier, NumInterlace denotes a number of HARQ interlaces, and $\lfloor x \rfloor$ denotes an operator indicating a maximum integer not exceeding 'x'.

17. The frequency hopping apparatus of claim 14, wherein the hopping sequence initial value input unit provides a value generated using the following equation and an interlace identifier every TTI as an initial input value of a hopping sequence:

$$\left\lfloor \frac{TTIid}{NumInterlace} \right\rfloor$$

where TTI id denotes a TTI identifier, NumInterlace denotes a number of HARQ interlaces, and $\lfloor x \rfloor$ denotes an operator indicating a maximum integer not exceeding 'x'.

18. The frequency hopping apparatus of claim 14, wherein the hopping sequence initial value input unit provides an initial input value of a hopping sequence every TTI using:

$$\left\lfloor \frac{TTIid}{NumTTIHopping} \right\rfloor$$

where TTI id denotes a TTI identifier, NumTTIHopping denotes divisors, a number of which is equal to a number of TTIs included in an HARQ RTT within one HARQ RTT, and $\lfloor x \rfloor$ denotes an operator indicating a maximum integer not exceeding 'x'.

19. The frequency hopping apparatus of claim 14, wherein the hopping sequence generator defines a parameter InterlaceCommonHopping, applies hopping every multiple TTIs when the InterlaceCommonHopping value is set to '1', and applies hopping every TTI when the InterlaceCommonHopping value is set to '0'.

20. The frequency hopping apparatus of claim 14, wherein the hopping sequence initial value input unit provides an initial input value of a hopping sequence for each individual interlace.

21. A base station apparatus for supporting frequency hopping in a wireless communication system supporting Hybrid Automatic Repeat reQuest (HARQ), the apparatus comprising:
a controller for determining whether a forward channel or a reverse channel for a specific terminal needs hopping every Transmission Time Interval (TTI); and
a data channel transceiver for sending to the terminal a command to perform hopping every multiple TTIs and simultaneously signaling information indicating a number of the multiple TTIs, when there is no need to perform every TTI.

22. The base station apparatus of claim 21, wherein the number of the multiple TTIs is a numeral corresponding to a divisor of HARQ Round Trip Time (RTT) when there is no need to perform hopping every TTI.

23. The base station apparatus of claim 21, wherein the base station sets a InterlaceCommonHopping value to '1' and signals the setting result when there is no need to perform hopping every TTI, and the base station sets the InterlaceCommonHopping value to '0' and signals the setting result when there is a need to perform hopping of allocating a different channel every TTI.

* * * * *